United States Patent
Ryabchun et al.

(10) Patent No.: US 8,135,774 B2
(45) Date of Patent: Mar. 13, 2012

(54) VIRTUAL CONTACT CENTER WITH DYNAMIC ROUTING

(75) Inventors: Andrey Ryabchun, San Francisco, CA (US); Petr Makagon, San Francisco, CA (US); Herbert Ristock, Walnut Creek, CA (US); Nikolai Anisimov, Concord, CA (US); Dave Sneyders, San Francisco, CA (US); S. Michael Perlmutter, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 563 days.

(21) Appl. No.: 11/616,738

(22) Filed: Dec. 27, 2006

(65) Prior Publication Data

US 2008/0162701 A1 Jul. 3, 2008

(51) Int. Cl.
  *G06F 15/16* (2006.01)
(52) U.S. Cl. .................. 709/203; 709/227; 379/265.02
(58) Field of Classification Search .............. 709/203, 709/206, 227; 379/265.02, 265.11, 265.12, 379/265.13, 200–202
See application file for complete search history.

(56) References Cited

U.S. PATENT DOCUMENTS

| | | | |
|---|---|---|---|
| 5,940,496 A * | 8/1999 | Gisby et al. | 379/265.02 |
| 6,173,053 B1 * | 1/2001 | Bogart et al. | 379/266.01 |
| 6,185,292 B1 | 2/2001 | Miloslavsky | |
| 6,289,094 B1 * | 9/2001 | Miloslavsky | 379/220.01 |
| 6,346,952 B1 | 2/2002 | Shtivelman | |
| 6,687,241 B1 * | 2/2004 | Goss | 370/352 |
| 6,798,876 B1 * | 9/2004 | Bala | 379/265.12 |
| 6,865,267 B2 | 3/2005 | Dezonno | |
| 6,952,732 B2 | 10/2005 | Nourbakhsh et al. | |
| 7,085,366 B2 * | 8/2006 | O'Neil | 379/265.01 |
| 7,526,439 B2 * | 4/2009 | Freishtat et al. | 705/26.41 |
| 7,558,383 B2 * | 7/2009 | Shtivelman et al. | 379/265.12 |
| 7,657,465 B2 * | 2/2010 | Freishtat et al. | 705/26.41 |
| 7,739,149 B2 * | 6/2010 | Freishtat et al. | 705/26.41 |
| 2005/0249196 A1 * | 11/2005 | Ansari et al. | 370/352 |
| 2006/0123060 A1 * | 6/2006 | Allen et al. | 707/200 |
| 2008/0155031 A1 * | 6/2008 | Fortier et al. | 709/206 |

* cited by examiner

*Primary Examiner* — Moustafa M Meky
(74) *Attorney, Agent, or Firm* — Donald R. Boys; Central Coast Patent Agency, Inc

(57) ABSTRACT

A network-based interaction system includes a machine connected to the network for receiving and routing an interaction request, a server application having access to the network for matching an interaction request to a profile, and a data repository for storing profile information.

11 Claims, 6 Drawing Sheets

VIRTUAL CONTACT CENTER WITH DYNAMIC ROUTING

CROSS-REFERENCE TO RELATED APPLICATIONS

NA

BACKGROUND OF THE INVENTION

1. Field of the Invention

The present invention is in the field of data communications, particularly in the area of session initiation protocol-based messaging including Instant Messaging and pertains to methods and apparatus for creating and managing a virtual contact center.

2. Discussion of the State of the Art

Instant Messaging (IM) is a communication medium based on Session Initiation Protocol (SIP). SIP is a well-known communication protocol created by the Internet Engineering Task Force (IETF). SIP is used over data networks to initiate and define multi party multimedia telephony and IP sessions including Voice over Internet Protocol (VoIP) and video streamed over the network using one of several known transport protocols such as Real Time Transport Protocol (RTP). In terms of the layers of the suite of Internet protocols, SIP sits in the application layer. In typical use, SIP is somewhat limited in scope to a dedicated purpose of building or initiating multimedia sessions, defining them using session description language (SDP), and then for tearing down those sessions when completed. It has occurred to the inventors that while SIP is not used to transmit documents, it is capable of handling multipart message bodies using MIME or S/MIME headers. Much information about SIP in particular is available at the following Web resource http://www.ietf.org/rfc/rfc3261.txt.

The popularity of communicating by way of instant text messaging (IM) has skyrocketed over recent years. Companies are employing IM technology and associated communications protocols in order to improve the quality of the customer experience and the quality of internal and external communications between the companies and their personnel and between companies and their external associates.

IM is a well known communications utility that allows persons to connect dynamically with each other and with groups during social interaction sessions where the contacted parties are selected from a personal or online list or directory. Using a presence protocol, IM interfaces may detect when a person listed in a group of people or whose credentials are presented in a profile of some kind is online and able to accept an IM.

The basic IM interface typically only supports session activity of those parties whom have published their information and personal preferences and have allowed certain other parties access to that information. Permission to engage in a session is typically granted by the receiver of a request for a session. It has occurred to the inventor that the use of IM capability could be a sound foundation for a high-level communications center environment complete with on-demand access and routed interaction requests.

What are clearly needed are methods and apparatus to integrate IM capabilities into call center communications environments including automated telephony applications and to enable dynamic creation of communities or groups of agents or experts to service community members.

SUMMARY OF THE INVENTION

According to an embodiment of the present invention, a network-based interaction system is provided. The system includes a machine connected to the network for receiving and routing an interaction request, a server application having access to the network for matching an interaction request to a profile, and a data repository for storing profile information.

In one embodiment, the interaction request is an instant message request for an instant message session and the machine is an instant message proxy server. In another embodiment, the interaction request is a vocalized request for an instant message session and the machine is an interactive voice response system. In yet another embodiment, the interaction request is a vocalized request for an instant message session and the machine is a Voice over Internet Protocol interface server. In a variation of the embodiment where the machine is an instant message proxy server the server application runs on the instant message proxy server.

In one embodiment, the profile is a group profile and the group comprises instant message contacts. In another embodiment, the profile is an individual profile of an instant message contact. In one embodiment, the network includes a telephone network and an Internet network.

According to another aspect of the present invention, a voice application is provided for suggesting an interactive data session based on matching a voice response to a profile. The voice application includes one or more routines for playing options, one or more routines for interpreting responses to the one or more options, and a routine for selecting one or more profiles from a repository of profiles based on the interpretation of the one or more responses.

In one aspect, the voice application is executed by an interactive voice response system. In another aspect, the voice application is executed by a voice over Internet protocol interface. In one aspect, and in ether of the above cases, the profile is a group profile. In another aspect the profile is that of an individual. In a preferred aspect, the interactive data session is an instant message data session.

According to another aspect of the present invention, on an instant message server, a method for searching a data repository for like profiles to establish a virtual group of instant message contacts is provided. The method includes (a) connecting to the instant message server, (b) accessing a search interface, (c) entering text into the search interface, (d) selecting a suggested aggregation of instant message contacts from a list of search results, and (e) activating a routine for establishing the group.

In one aspect, in step (c), the text includes keywords and, or phrases. Also in one aspect, in step (d), the search results are organized by percentage of match. In all aspects, in step (e), activating the routine is accomplished by clicking an icon. In one aspect, in act (e), a group profile is created for the established group. In a variation of this aspect, the group profile is retained after the virtual group is deleted to enable fast reassembly of an updated version of the group.

BRIEF DESCRIPTION OF THE DRAWING FIGURES

DETAILED DESCRIPTION

Figure 1:
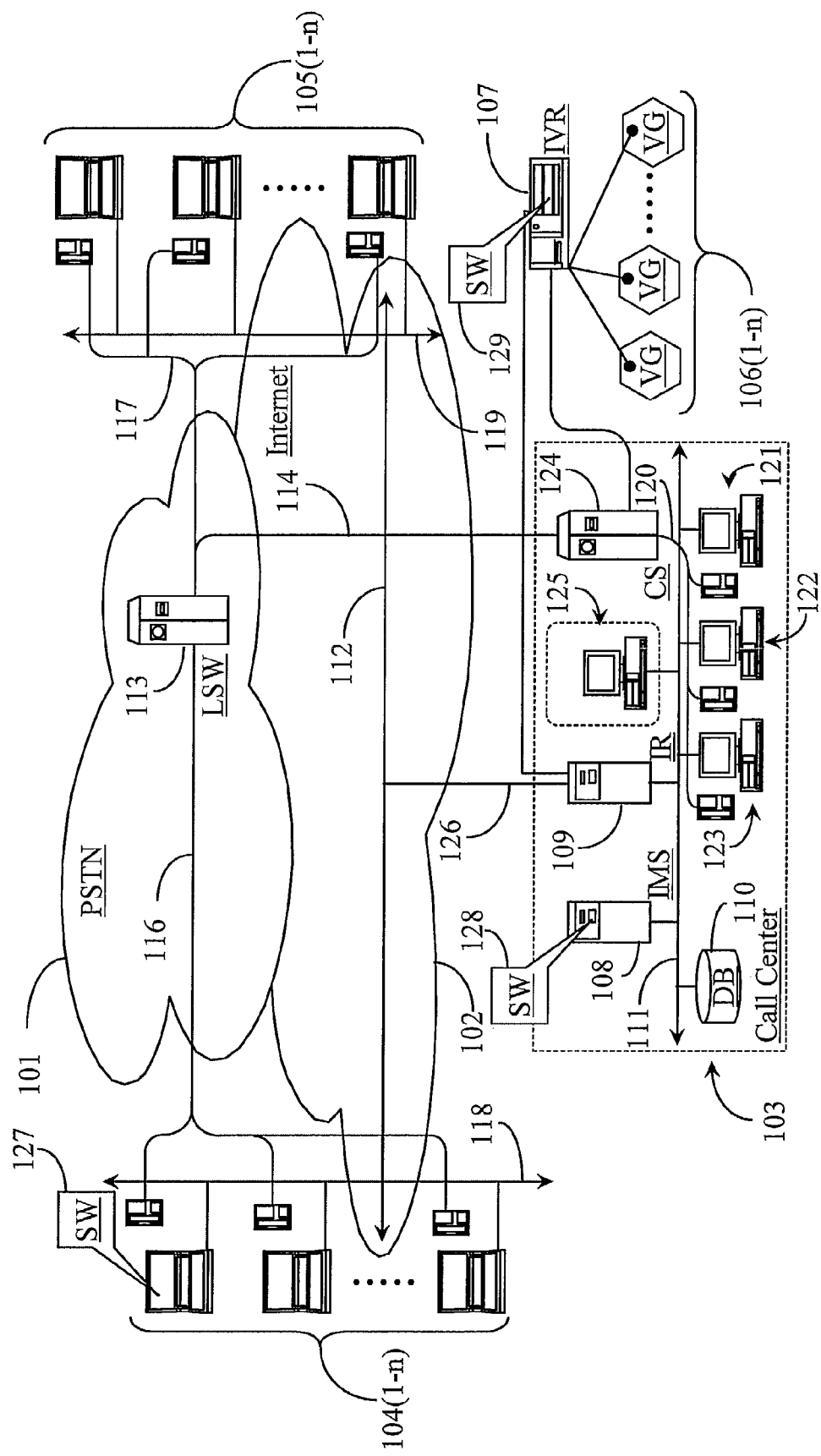
FIG. 1 is an overview of a communications network environment supporting IM-based call center functionality according to an embodiment of the present invention.

FIG. 1 is an overview of a communications network environment supporting IM-based call center functionality according to an embodiment of the present invention. A communications network is illustrated in this example and includes a public switched telephony network (PSTN) 101, the Internet 102, and a call center 103.

Call center 103 is a state-of art call center with connectivity to PSTN 101 and to Internet 102. Call center 103 may be hosted by a company providing services and products to consumers or customers and may be connected through PSTN and Internet networks to other regional call centers without departing from the spirit and scope of the present invention. Only one call center is illustrated in this example and is deemed sufficient by the inventor for illustrating the present invention.

Call center 103 has a local area network (LAN) 111 that is enhanced for Internet communication including SIP-based messaging and communication. LAN 111 supports several agent workstations illustrated herein as workstation 121, workstation 122, and workstation 123. There may be many more workstations present in this example than are illustrated. Workstations 121-123 each has a LAN connected personal computer (PC) and a telephone switch-connected telephone. In this embodiment, the telephones are connected to a central office telephone switch (CS) 124 via internal telephony wiring 120. CS 124 may be a private branch exchange (PBX) or other internal telephone switch without departing from the spirit and scope of the invention.

In a preferred embodiment, switch 124 is computer telephony integrated (CTI) enabled and is connected to an intelligent peripheral, IVR 107 by a CTI link 120. IVR 107 has a network link to an Internet router (IR) 109 that is connected to LAN 111. IR 109 also has connection to Internet 102 via an Internet access line 126 to an Internet backbone 112. Call center 103 may maintain or host Internet services accessible to customers accessing Internet 102.

CS 124 has a telephony trunk (114) connection to a local telephone switch (LSW) 113 in the PSTN network. In one embodiment, call center 103 does not maintain a local telephone switch for internal routing, but relies on a Centrex system provided by the telephone company. In either case, center 103 may still have a routing station for internal routing.

LAN 111 supports an Instant Message server (IMS) 108. IMS 108 includes a database (DB) 110 also connected to LAN 111. IMS 108 is maintained by the company hosting call center 103 in this example, however IMS 108 may also be provided by a third party service that may provide SIP-based communication services to call center 103. In normal call center activities agents 121-123 may answer PSTN calls from the PSTN network using connected telephones and may handle IP interactions like email, and the like from LAN connected PCs. Logically speaking, LAN 111 is a segment of Internet 102 and is always connected for high-speed access.

Agents working at stations 121-123 have SIP-based IM capabilities as well as presence protocol-enabled capabilities as is normally the case with IM software. Contact center 103 also has remote agents 105(1-n) each adapted with at least a computer and a telephone. In this case, the computers are Laptop computers, but they may be any type of Internet capable appliance. Agents 105(1-n) have connection to Internet 102 via an Internet access line 119. In this case, agents 105(1-n) have telephone connectivity to PSTN 101 through telephone branch 117.

Customers of call center 103 are illustrated in this example as customers 104(1-n). Customers 104(1-n) each have a computer and a telephone and have Internet access through Internet access line 118 and telephone access through telephone branch 116. It is important to note herein that remote agents 105(1-n) and customers 104(1-n) are illustrated in no particular order or designation. That is to say that agents and consumers may be part of a large community of IM users that may subscribe to a unique IM service provided by a third-party on behalf of the company hosting call center 103, or directly by the company hosting call center 103. Likewise, agents that are physically stationed within the physical domain of call center 103 may be members of the same overall community of users. The designations then of customers, consultants, agents, representatives, and so on may be arbitrarily set by each individual that is a community member.

An instance of IM software (SW) 127 is illustrated on a machine of one of customers 104(1-n). Similar instances may be present on all of the illustrated computers in this example. The IM software may be a proprietary instance of SW or it may be an existing instance of IM software that may be enhanced by the addition of specific features and capabilities of the present invention. An instance of IM management software (SW) 128 is provided on IMS 108. SW 128 is adapted to enable users to subscribe to IM features and services according to aspects of the present invention. An instance of IM SW 129 is provided in this example on intelligent peripheral 107, which is an IVR in this case. SW 129 is integrated with one or more telephony voice applications that may be accessed by users. Integration provides IM routing and SIP session connection services for callers interacting with the one or more voice applications.

In general practice of the present invention, users may be any mix of experts, company representatives, sales agents, and general users including clients and consumers who are included in an overall IM space or community of users. User profiles are dynamic and may be created and updated according to enterprise rules. Users may search profiles of other community members and form a virtual group of members designated for a specific purpose such as customer service, sales, consulting or the like. There may also be existing groups of users that are more static that are formed by an authorized representative of the company for whom the service exists, or by the third-party service managing communication for the company.

A group of users may be formed by like attributes that exist in each of the individual users' profiles. For example, if the company has sales agents that qualify to represent the company in computer hardware, that attribute may be included in each of those agents' profiles. In this way, a sales manager may quickly form a virtual group (VG) of agents that may represent the company's computer hardware products to the rest of the community. The agents may be any mix of internal agents (those stationed within call center 103) and remote agents (agents operating from other company locations, from home, or from a temporary location). A search function is provided with IM SW 127 as an added feature to enable searching of user profiles according to keyword or phrase. Product information may also be used to search user profiles in some cases. For example, a user may input a product serial number and get a virtual buddy list of all users that have that specific number in their profiles.

VGs that are created by company representatives may have many purposes. One purpose may be sales, another purpose may be technical assistance, and another purpose may be conducting an outbound sales campaign. VGs may be created to solve a problem. Two or more created VGs may be integrated to perform a complicated transaction. For example, a VG may be formed to take calls from mortgage applicants and access their needs, another VG may be in place to verify credit and quote interest rates or deny services to those applicants, and yet another may be formed to broker the loans for those applicants who qualify.

All user profile information and user identification information is maintained in DB 110 and is accessible through IMS 108. A moderator operating at a station 125 connected to LAN 111 may be provided to manage or moderate certain aspects of the communities and groups formed. A group may be formed and then later disbanded. A group may be formed dynamically by any user as well.

In one embodiment, users, such as users 104(1-n) may place VoIP calls or PSTN calls into call center 103 and center 103 may have those calls routed to IVR 107 for handling according to an embodiment of the present invention. For example, VoIP events may be routed via IR 109 to IVR 107. During interaction, IVR 107 may ask callers certain questions to determine purpose for the call and then may select a VG from multiple existing VGs to handle the call. The caller may be routed, in a virtual sense, to a VG and may finish any required tasks while interacting with one or more members of the VG whose profiles and online status are visible to the caller from the caller's IM interface. If the caller SW 127 supports VoIP telephony, then all of the interaction can take place on the caller's computing device. The new VG will appear in the caller's IM buddy list and the caller need only double click the list to join and have access to individual profiles in the list.

For regular telephone interaction, a caller may place a PSTN call that is routed to CS 124 and then to IVR 107 for call handling. A CTI voice application with voice recognition will greet and interact with the caller to determine the purpose of the call. The application may select a VG for the caller based on results of the interaction. In this case, since the caller is a member of the overall community, he or she may have to provide some information that can be correlated to information in database 110. The VG selected by IVR 107 for the caller may appear in IM server 108 under a personal page the caller acquired when he or she subscribed to the service. The next time the caller logs into the interface, the VG will appear in the caller's buddy list as a new group. The caller may then interact with the group as a member.

In the example above, IVR routing is limited to selecting a VG of more than one IM community member that represents the best match for the call. In this case, the caller may carry out a transaction through IM activity with one or more members of that group if desired. In another case, IVR 107 may route a call directly to another community member or member of a VG. In this case, the callers' needs may require a specific agent or member due to past experience with the caller, or some other requirement. In that case, IVR 107 aided by SW 129 may perform a DB lookup in DB 110 to find the specific member that the call will be routed to.

It is noted herein that notifications of IM requests can be sent to IM community members whether they are currently logged into the system or not. When a member logs into the system, any pending requests could be queued for the member at server 108 and the member could see the queue appear in his IM SW interface and may immediately begin processing the requests. It is noted herein that some request originators may be offline when one of their requests is processed. In that case, the agent or member processing the request can log a response to server 108, which the caller will see when again connected to the server. The presence information both in a queue of requests and in a virtual group of members is always visible to the other parties. An agent working a queue of IM requests may handle them in any order such as handling the requests from originators that are online first.

In one embodiment of the present invention, a user does not have to interface with IVR 107 to reach one or more IM contacts. All of the members of the IM community and their online/offline or available/unavailable status are known to IMS 108. Therefore, any user may browse or search profiles and may send requests to any found. Searching and aggregating profiles in a group like a virtual group enables a user to assemble more than one expert, for example, to get help with some problem or to help make a final decision before buying a product.

In one embodiment, any user may create or establish a virtual group by entering text keywords or phrases into a search engine provided for the purpose. The search results returned may show a list of suggested groups based on percentage of match to the entered criteria. The user may establish any of the assembled groups by selecting it and clicking an interactive icon for establishing the group. In the case of an established group, a new group profile may be created for that group and entered into the database. If the group is latter deleted from the user's "buddy list", the group profile including data identifying all of the contacts in that group may be retained so that the same group may be quickly reassembled. In one embodiment, reassembly of a virtual group using the group profile created for that group may include new contacts that were entered into the system since the VG was deleted, thus providing an updated version of the virtual group.

In a variation of the embodiment described above, a user may be in the market for a new pickup truck. The IM space available to the user may include multiple members of the community who happen to be auto dealers or sales people. The user might form a virtual group of those auto dealers or sales persons and then interact with various members before selecting one to buy a truck from. There are many varied use cases that are possible. In one embodiment, users may add profile information to other members' profiles. For example, a user may add profile keywords or other information to a member profile that will only be visible to the user who added the information. In this case, the added information is a tag that reminds the user of the member based on some past interaction or just flags the member to the user as a preference indicator.

A total IM space for eCommerce might include personnel from multiple competing organizations or businesses along with a wide array of possible consumers. In this model, the customer may perform all of the interaction required to isolate an individual or group of individuals that might best serve a given need.

Figure 2:
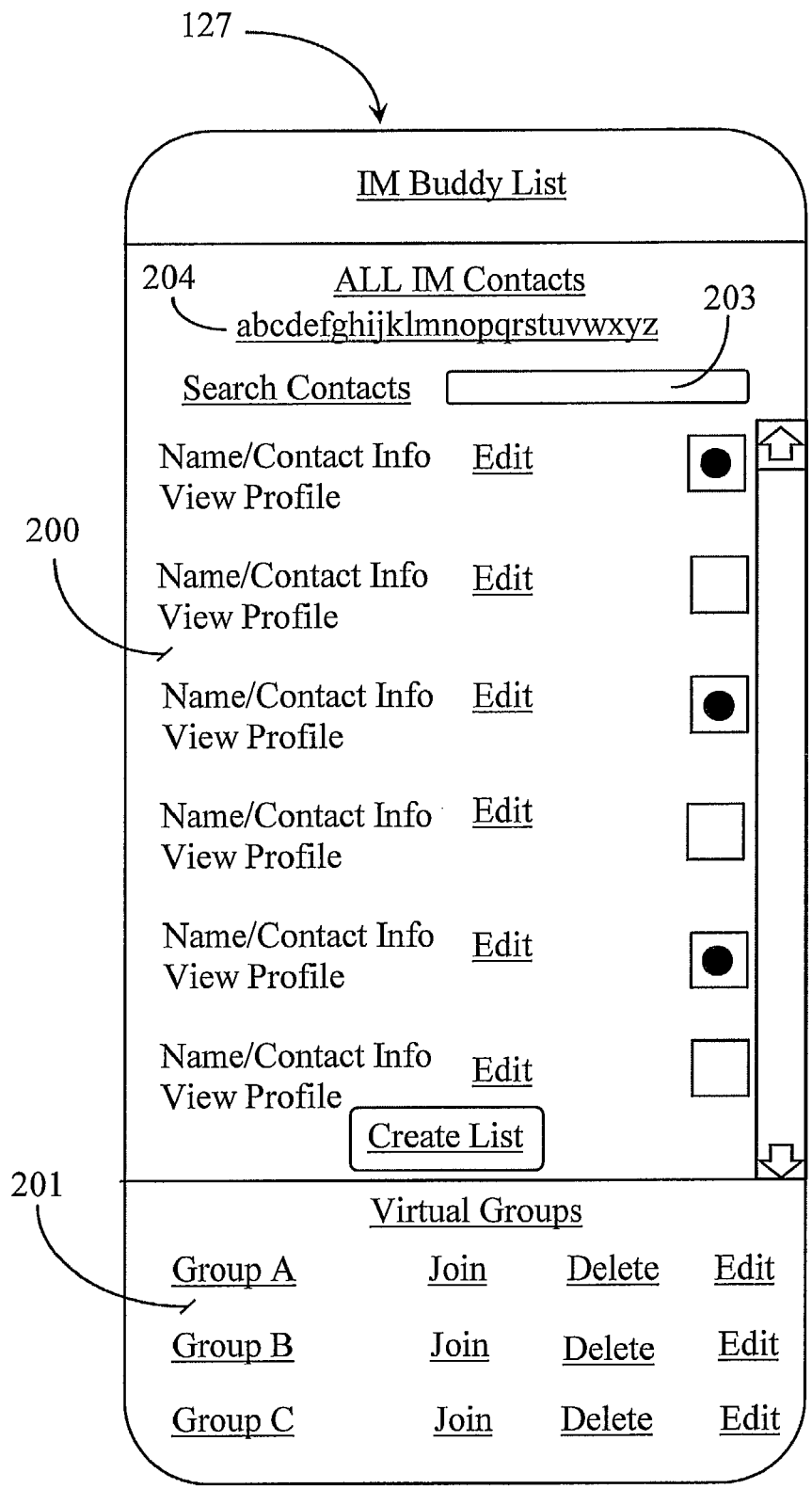
FIG. 2 is a plan view of an exemplary IM screen according to an embodiment of the present invention.

FIG. 2 is a plan view of an exemplary IM screen of SW 127 of FIG. 1 according to an embodiment of the present invention. Screen 127 illustrates an IM buddy list according to an embodiment of the present invention. Screen 127 includes a contact list window 200 that can display all of or a portion of the contacts in a total IM space. Window 200 is scrollable and a user may list contacts by the alphabet. For example, clicking a may cause a list of all contacts with the first or last name beginning with the letter a. Each contact has a name, contact information and an expandable profile link. Each contact may also have a presence indication of online, offline, online but not available, and so on. The total IM space, including all of the contacts may be available to the interface only when logged into the IM server. Personal buddies, who may or may not include members of the total IM community of the service of the present invention, may be visible in the user list whether the user is logged on or off of the server.

A user may select contacts for inclusion into a group by marking a check box next to the contact. An interactive "floating" button for creating a list of contacts displays near the bottom of the visible portion of screen 200. A user may manually browse contacts in screen 200 and select those to appear in a new contact list, which would take the form of a virtual group. A second window 201 lists virtual groups that the user has created. There are 3 illustrated groups, group A, group B, and group C. A user may elect to join any of the groups created by clicking join or any group may be deleted by clicking delete. Likewise, when a user logs into the server, some static virtual groups created by the host or the company serviced by the host may already be available in the list of virtual groups in screen 201.

A user may edit the profiles of any of the displayed contacts in screen 200 by clicking edit. Editing a user profile may server the user by enabling the user to tag certain information to the profile that may not be in the profile. This type of information may include reminders, preference information, or other types of information that may personalize that contact to the user. The editing of the profile in this way may not be visible to any other user unless the owner of the profile enables users to publish their comments or information tags.

The contents of screen 200 may be modified by performing a search of all or some of the contacts using a search interface 203 provided within the scrollable list area. Search function 203 can be used to quickly assemble a group based on the need of the user. For example, if a user needs some technical help with an operating system, he or she might use the term operating system or OS in the search interface. All contacts having OS somewhere in their profile will then appear in a list replacing the total list of contacts. The user may then create a list of all or some of those contacts. Right clicking in the window, for example, may bring up further options like select all, remove all, etc. Double clicking on any contact may initiate an IM request to that contact.

IM screen 127 may include a queue list (not visible in this example) that may hold pending IM requests from other users. For example, if one community member is a popular sales agent, his queue list may be robust with pending requests. Those requests also indicate whether the originator is online or not as long as the agent is logged in to the server. A user may edit a group by expanding the group to a list of individual contacts and then adding or removing contacts.

Figure 3:
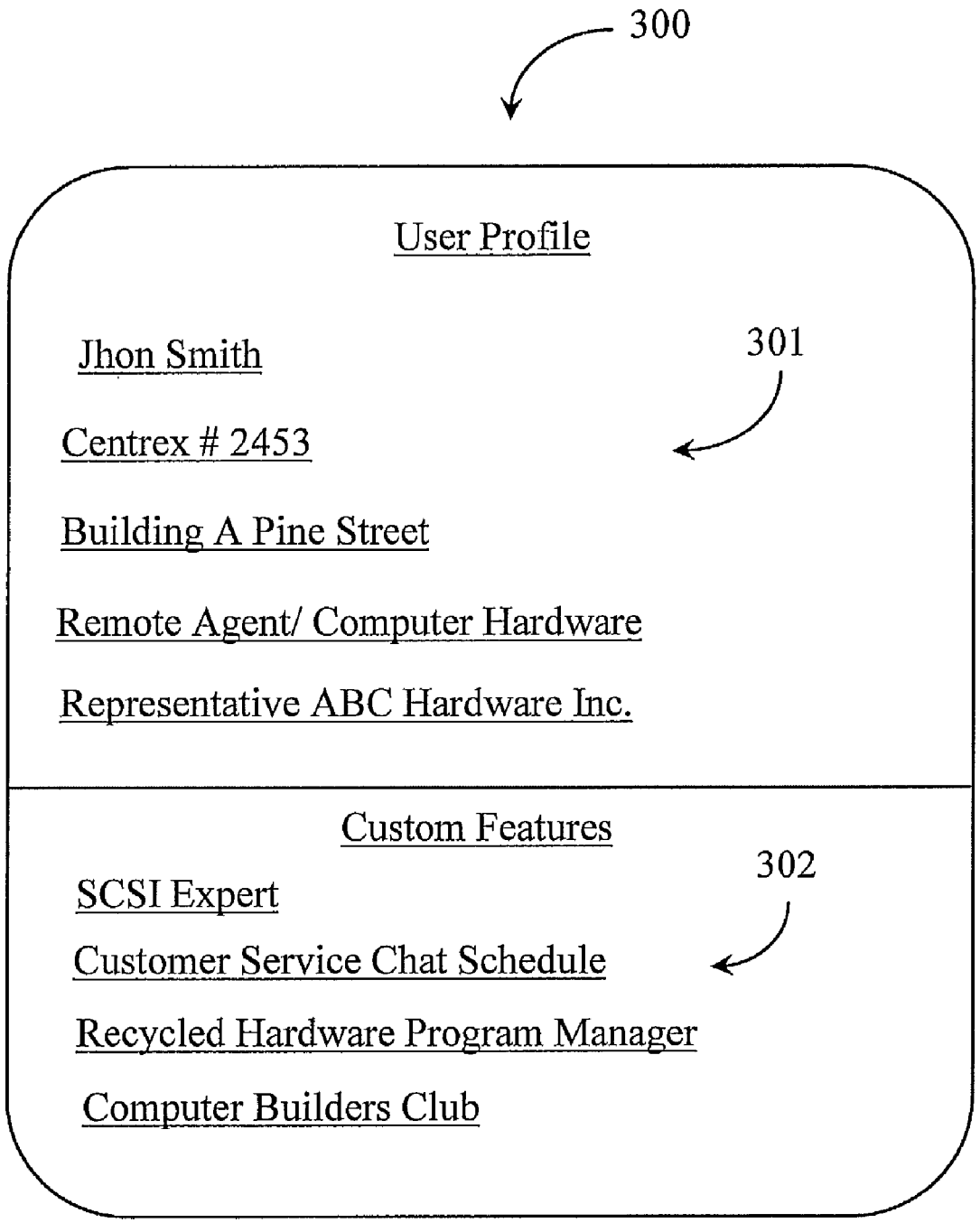
FIG. 3 is a plan view of an exemplary window illustrating a dynamic IM user profile according to an embodiment of the present invention.

FIG. 3 is a plan view of an exemplary window 300 illustrating a dynamic IM user profile according to an embodiment of the present invention. Window 300 may display for a user as the result of the user clicking on view profile associated with a contact listed in screen 200 of FIG. 2. A user profile includes normal profile information, in this case, John Smith, a Centrex phone number, a building location, identification of a remote agent in computer hardware, and identification of the agent being a representative of ABC Hardware, Inc.

A second user profile window 302 is provided for a user to add custom features to the profile that may, in one embodiment, help the user to better personalize the contact to the user. For example, after experience in interacting with the contact John Smith, the user may learn that John is a Scussy (SCSI) expert. He may add that fact as a custom feature to the user's profile. The user may, in one embodiment, tag information to the profile like a customer service chat schedule.

Other added custom features in window 302 include information that John is a recycled hardware program manager and that he is a member of a computer builders club.

In one embodiment, extra information added to a profile by a user who does not own the profile is visible only to the user that added the information. In that case, the information is meant to help the user better manage the contact. In another embodiment, information added to a profile may be published if permission to publish the added data is granted by the owner of the profile. In the later case, information like comments from customers may be added to an agent's IM profile for rating purposes similar to comments posted to an EBay seller's Website. Positive comments give the agent better rating with a service while negative comments take away from the agent's status.

In still another embodiment, profiles may be added to automatically by the system as a way to publish use experience data about an agent. This embodiment assumes that there is a first or third-party interaction tracking system and database adapted to document IM transaction activities like sales, customer service events, and so on. In this embodiment, expanding a contact's profile may reveal how much experience the contact has working in the system in terms of hours of interaction, days worked, number of transactions concluded, number of events conducted, satisfaction rating, and so on.

In one embodiment, a combination of the described interactive profile features may be practiced. For example, a window may be provided to add tags and other data visible only to a user that adds them while a separate window may be provided to contain system-added performance data, and a third window may be added that contains user comments about the interaction experience with the contact.

Figure 4:
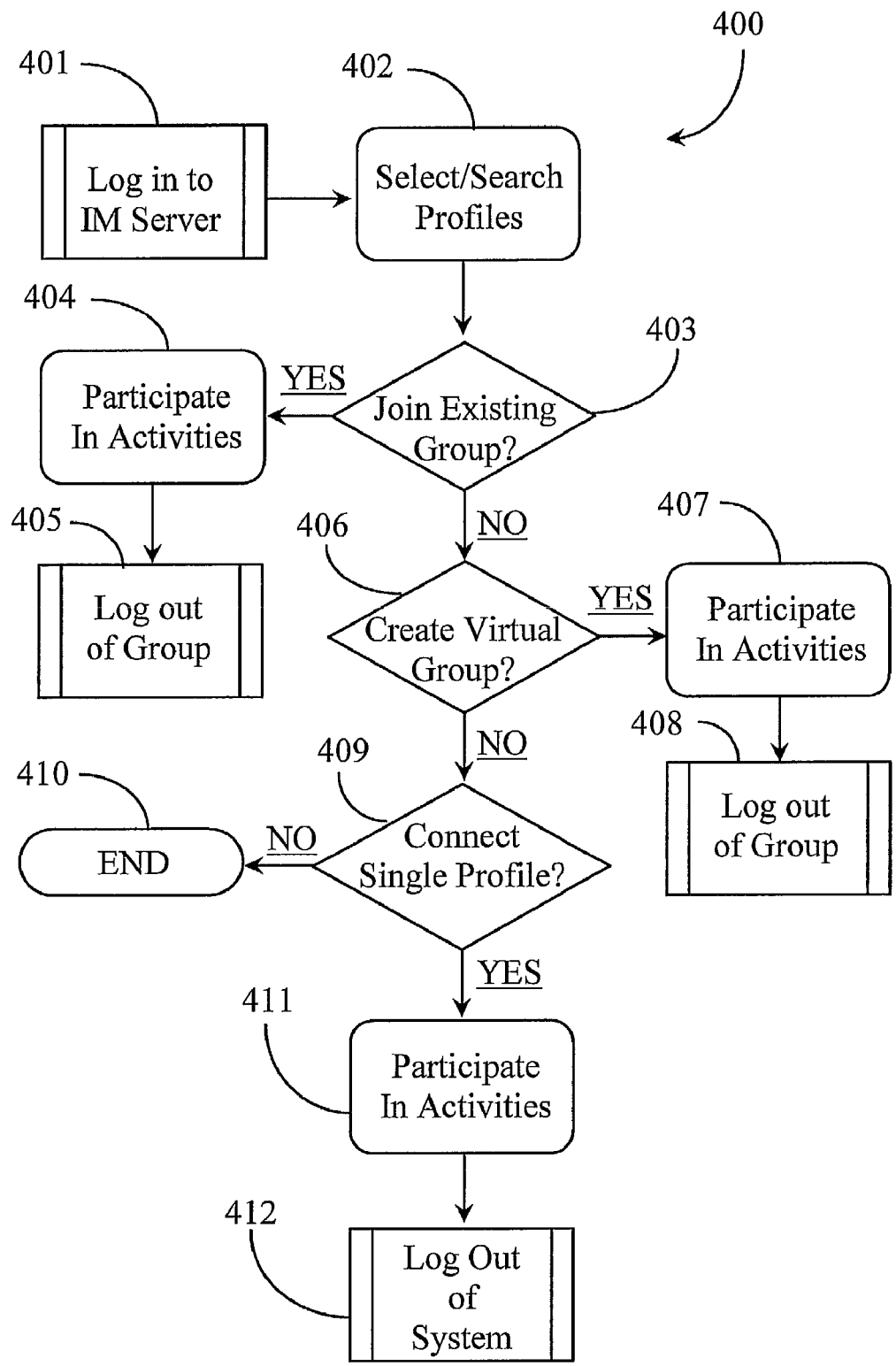
FIG. 4 is a process flow chart illustrating steps 400 for interacting with an IM communications network according to an embodiment of the present invention.

FIG. 4 is a process flow chart illustrating steps 400 for interacting with an IM communications network according to an embodiment of the present invention. In step 401, a user logs into an IM server. In step 402, the user may select or search and select profiles of users in the total IM space. Alternatively, at step 403, a user may simply join an existing virtual group of users that is already available. At step 403, if the user joins an existing group, then in step 404 the user may participate in activities available through the group. Activities may include group chat sessions, transaction processing with one or more group members, and so on. It should be noted herein that a user is not limited to only using IM to communicate. The network is IM based, but other mediums of communication may be allowed as desired. Other communication tools may be governed somewhat by user, group, or system rules. Email, telephone, VoIP, text messaging, and the like are possible within the IM-based network. After participating in activities in step 404, the user may log out in step 405.

If a user does not join an existing group in step 403, then the user may decide to create a group in step 406 from contacts selected in step 402. If the user creates a virtual group in step 406, the user is included in that group and may participate in group activities in step 407. The user may log out of the group in step 408. Logging out of a group in steps 405 and 408 should not be confused with logging off of the server. The user may login and out of groups and perform many activities before finally ending a server session.

If the user decides not to create a group in step 406, then in step 409 the user may decide to connect to a single profile. If the user decides not to connect to a single contact, then the process may end in step 410 with the user logging out of the server. In that particular branch of the process the user logged into the IM server in step 401 and did not initiate any requests to join a group, create a group, or interact with any other users during the session. If the user decides to initiate an IM request to a single profile, then in step 411 assuming the request is accepted, the user may participate in activities. At the end of a server session, the user may log out of the system in step 412.

Figure 5:
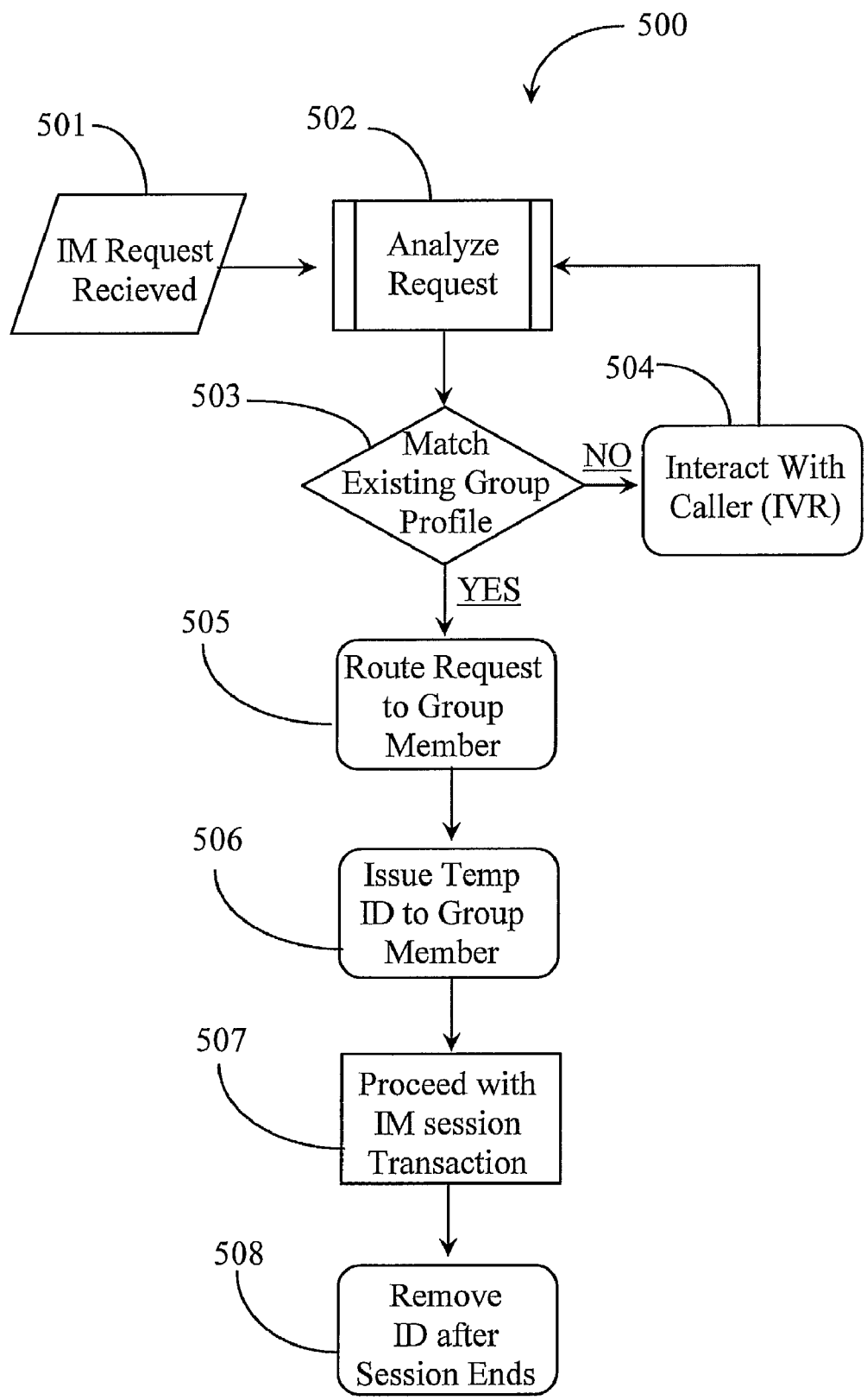
FIG. 5 is a process flow chart illustrating steps 500 for interacting with an IM-based routing application according to an embodiment of the present invention.

FIG. 5 is a process flow chart illustrating steps 500 for interacting with an IM-based routing application according to an embodiment of the present invention. In step 501, an IM request for interaction is received. In this step, the IM request may be received by a proxy server. In one aspect, the proxy server may be the IM server. In step 502, the receiving system analyzes the IM request to determine if there is enough information to route the request. In step 503, the system attempts to match the request to an existing group profile or to an existing member profile according to information received in the request. The process order assumes that the user is a customer attempting to engage in some transacting with the enterprise. This process also assumes that there are existing organized virtual groups of agents or customer service persons available in the system.

If the information in the original request is not sufficient to match the request to any existing group profile or member profile in the system, then in step 504, the system may interact with the requester to obtain some more information about the purpose of the request. The system, if server-based, may respond to the request in step 204 with an instant message or some other approved communication tool asking one or more questions of the requester to solicit some further information to help route the request.

In one embodiment, the matching criteria for routing an IM request to a profile of a group or a community member is based on a percentage match or a percentage threshold. In one case, if there is insufficient information to get a good match to a profile, the profile that the requests matches most closely will, by default be served to the system for routing purposes. The original request may indicate that the user wishes to join an existing group but wants to be routed to an appropriate group. On the other hand, the request may indicate that the user wishes to contact an individual that is not necessarily part of an existing group.

If in step 503, the system successfully matches the request to an existing profile, then in step 505, the system routes the request accordingly. It is important to note herein that if the user is simply joining a group, then the system will automatically join the user to the group and the group will appear in the user's interface. The user may then interact with one or more members of the group. If in step 505, the request is routed to an individual, then the system may forward the request to the interface of the individual. If the target member is online, the request may be delivered immediately to the interface where it may be queued for service. If the member is offline, the request may still be routed with a notification that the target member is currently unavailable, offline, away, out to lunch, or the like as determined by leveraging presence information.

In one embodiment of the invention, the system may issue a temporary ID to a member that was targeted in the request routing so that when the member interacts with the requester in step 507, the member's real identity is protected. Step 506 is not required in order to practice the invention. Once routing has occurred and a member has accepted the request, then the user may proceed with an IM session or transaction with the member. In the case that a temporary ID is issued to an accepting member, then in step 508, the system removes the temporary ID after the transaction has been completed. For tracking purposes, each request and subsequent session that is established may include some form of issued ID tag or ID number that may be used to sort interaction records of the total activity that has occurred with respect to the total IM space. In a robust system, some identification and tracking system other than simple SIP session ID and timestamp information may be desired.

Figure 6:
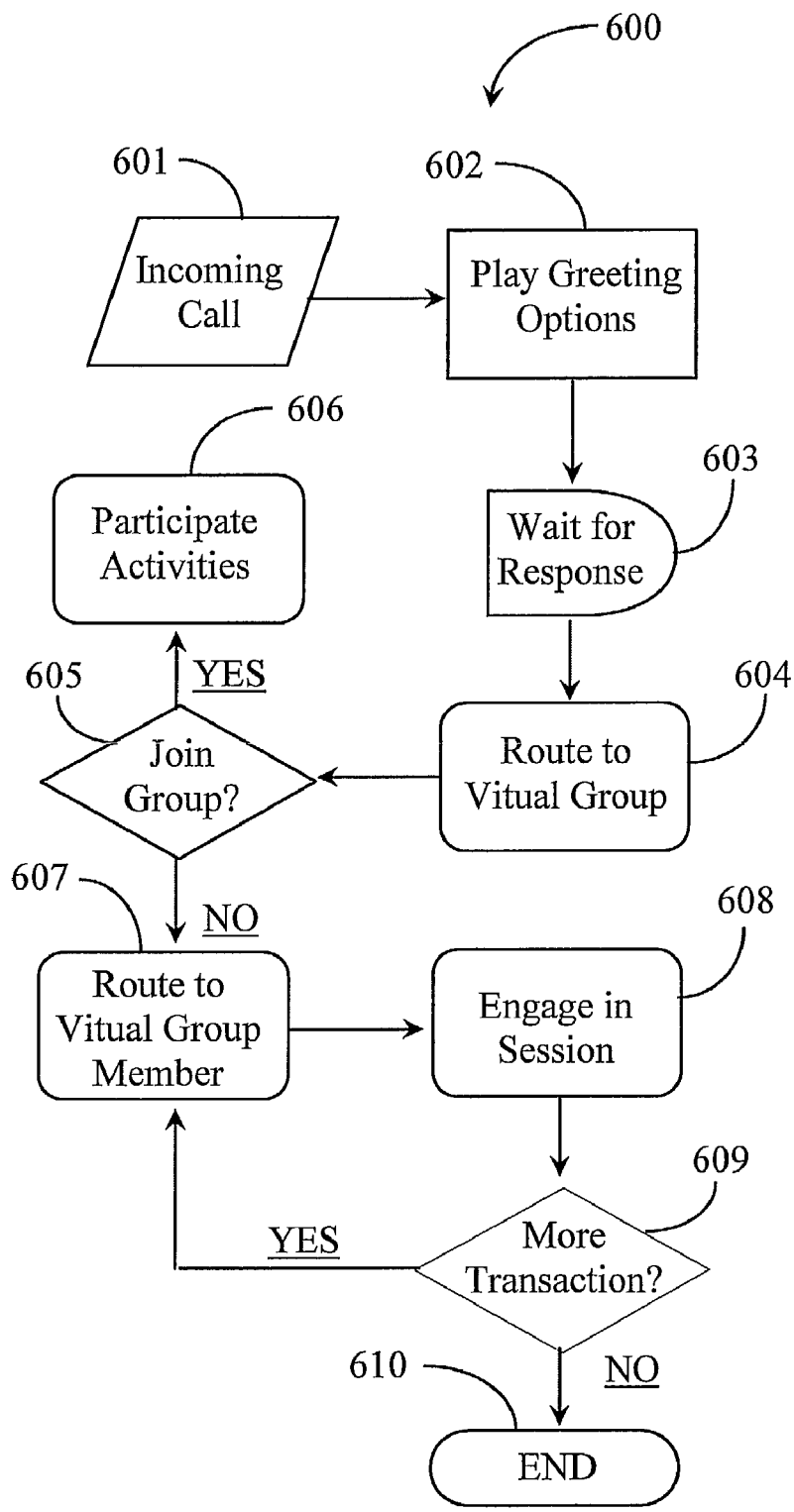
FIG. 6 is a process flow chart illustrating steps 600 for interacting with a voice-enabled IM routing system according to an embodiment of the present invention.

FIG. 6 is a process flow chart illustrating steps 600 for interacting with a voice-enabled IM routing system according to an embodiment of the present invention. In step 601, an incoming call is received from a voice caller. The receiving system may be an IVR or a VoIP version of an IVR system. In step 602, the system plays a greeting and presents typical voice options to the caller. In step 603, the system waits for a response from the caller. In step 604, the system receives and recognizes the user response and routes the request to a virtual group. In this case, it is assumed that the IVR options are by default routing to an existing group and letting the user decide whether they want to join that group. This consideration is for convenience only in that according to a spoken intent or selected options, groups may be already set up to handle those requests in a more structured embodiment.

To exemplify the above scenario, a banking system may have various groups of agents that perform various tasks, for example, loans, savings accounts, checking accounts, tellers, and investment accounts. Therefore there may be 5 groups that exist to service customers of that bank. The user response in step 603 may have been "loans". There still may be further options and group divisions such as "new loans or existing loans"? In any case, in step 604, the appropriate group is selected for the user and the user may be prompted to join the group in step 605.

If the user joins the group in step 605, then the user may participate in group activities in step 606. The user will see all of the contacts in the group and their online offline status and online availability information. In this embodiment, customers may be hidden from each other for privacy concerns and to save space in the customer IM interface.

In step 606, the user may decide not to join the group, in which case, the system may route the request from the customer to a next destination in step 607. The next destination may be one of the group members that work in loans. In this case, the user would not see the contacts of the loan department in the IM interface. When the request is accepted, the session may be established in step 608. After interacting with the contact, the system may prompt the caller in step 609 to see if there are any more transactions desired. If there is another desired transaction, it is spoken by the user to the system and the process moves back to step 607 where the system routes the user to the next destination, which could be a new group or another member of the same department.

If there are no more transactions desired in step 609, then the user may disconnect from the voice enabled IM routing system log out of the server. The user may still be logged into the IM server and may engage in further IM activities. If the system is an IVR and the caller is using a PSTN telephone, the user will also have to be logged into the IM server while he is talking on the telephone. A CTI link at the IVR enables proxy control of the IM server. If the voice system is VoIP, is may be part of the IM server or separate from the IM server with control of the IM server accomplished via a data link a user may interact with the system directly through the IM interface using VoIP software or in another case, an IP telephone can be used to interact with the system.

The system of the present invention may be practiced by a third-party offering IP Centrex type services to companies without departing from the spirit and scope of the present invention. For companies, a significant amount of call center traffic may be handled by the system of the invention. The invention can be practiced by any user having an Internet-capable computing device and an IM interface. For existing IM systems, the invention may be packaged as a bundle of features provided to existing IM customers where participation companies including banks, stores, and other high traffic organizations could participate to gain customers. Practiced over secure connections like SSL, transactions including submission of sensitive information may be private and secure so that no other users may access information or determine the exact nature of a transaction. For other services like customer service chat, normal channels may be used.

For example, a server enforced secure connection can be established for any user about to engage in a secure transaction using an IM interface. As well, other communications tools are available for submitting secure information such as a telephone for example. In one case, agents practicing from their IM interface can lead customers to a transaction and then redirect them to a secure Web site so that they may perform the usual Web-based order without worrying about security issues. There are many possibilities.

The present invention should be afforded the broadest interpretation in light of the embodiments described. The spirit and scope of the present invention should be limited only by the claims that follow.

What is claimed is:

1. A network-based interaction system comprising:
    a computerized router machine connected to the network, executing software from memory for receiving and routing an interaction from an initiator;
    an instant message (IM) server connected to the network accessible to the router machine executing IM software; and
    a function of the software executing on the router matching the interaction to an agent profile, created and stored by the IM software, having at least contact and personal characteristic information for an agent, the agent profile part of a virtual group identified by a characteristic common to all agent profiles in the group;
    wherein the interaction includes at least a specific agent characteristic required to service the interaction matched by the router machine to a characteristic in the agent profile and the router machine routes the interaction to an agent contact matching the agent profile.

2. The system of claim 1, wherein the interaction is any one of an instant message, Email, telephone, Voice over Internet Protocol (VoIP), text messaging and the computerized router machine functions as an instant message proxy server.

3. The system of claim 1, wherein the interaction is a vocalized request for an instant message session and the computerized router machine functions as an interactive voice response system.

4. The system of claim 1, wherein the interaction is a vocalized request for an instant message session and the computerized router machine includes a Voice over Internet Protocol interface server.

5. The system of claim 1, wherein contact is an instant message contact.

6. The system of claim 1, wherein the network includes a telephone network and an Internet network.

7. A voice application executing from memory of an Interactive Voice Response (IVR) server for suggesting an interactive data session contact based on matching a voice response from a caller to agent profiles stored at an Instant message (IM) server accessible to the IVR comprising:
    one or more routines receiving a voice response at the IVR and playing options for the voice response;
    one or more routines for interpreting voice responses to the one or more options; and
    a routine for selecting one or more of the agent profiles from a repository of agent profiles at the IM server based on the interpretation of the one or more of the responses;
    wherein the interpretation includes at least an identified characteristic required to service the interactive data session and the selected agent profile includes at least the identified characteristic and a contact for an agent available for an interactive data session.

8. The voice application of claim 7, executed by a voice over Internet protocol interface.

9. The voice application of claim 7, wherein the agent profile is part of a virtual group profile at the IM server wherein agent profiles of the virtual group have a common characteristic.

10. The voice application of claim 7, wherein the agent profile is that of an individual.

11. The voice application of claim 7, wherein the interactive data session is an instant message data session.

* * * * *